(12) United States Patent
Hingel et al.

(10) Patent No.: US 10,442,338 B2
(45) Date of Patent: Oct. 15, 2019

(54) METHOD, WORKING ILLUMINATION, AND MACHINE FOR ADJUSTING THE LIGHT OF ILLUMINANTS

(71) Applicant: HELLA GmbH & Co. KGaA, Lippstadt (DE)

(72) Inventors: Andreas Hingel, Enzersdorf an der Fischa (AT); Christoph Jandrisits, Olbendorf (AT)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/180,526

(22) Filed: Nov. 5, 2018

(65) Prior Publication Data

US 2019/0143880 A1    May 16, 2019

(30) Foreign Application Priority Data

Nov. 10, 2017    (DE) .......................... 10 2017 220 014

(51) Int. Cl.
*H05B 37/02* (2006.01)
*B60Q 1/00* (2006.01)
*B60Q 1/02* (2006.01)

(52) U.S. Cl.
CPC ............ *B60Q 1/0094* (2013.01); *B60Q 1/02* (2013.01); *H05B 37/0263* (2013.01)

(58) Field of Classification Search
None
See application file for complete search history.

(56) References Cited

U.S. PATENT DOCUMENTS

2016/0029460 A1    1/2016  Bean et al.
2016/0200240 A1*   7/2016  Quinlan ............... B60Q 1/0023
                                                         315/80

FOREIGN PATENT DOCUMENTS

DE           102010030520 A     12/2011

OTHER PUBLICATIONS

Extended European Search Report for European Application No. 18205374.4 dated Feb. 26, 2019, with its Englis summary, 9 pages.

* cited by examiner

*Primary Examiner* — Jany Richardson
(74) *Attorney, Agent, or Firm* — Bret E. Field; Bozicevic, Field & Francis LLP

(57) ABSTRACT

The present invention relates to a method for adjusting the light of at least one illuminant (10) of a working illumination (100) of a machine (200) by means of a control unit (20) and at least one signaling device (50), the control unit (20) having a signal connection to the at least one illuminant (10) and to the at least one signaling device (50) by means of signal lines (30), the light of the at least one illuminant (10) being performed by modulating a voltage supply of the illuminants (10) and/or of the at least one signaling device (50) via the signal lines (30) by means of the control unit (20). The invention further relates to a working illumination (100) and a machine (200) for carrying out a method according to the invention.

6 Claims, 2 Drawing Sheets

METHOD, WORKING ILLUMINATION, AND MACHINE FOR ADJUSTING THE LIGHT OF ILLUMINANTS

Figure 1:
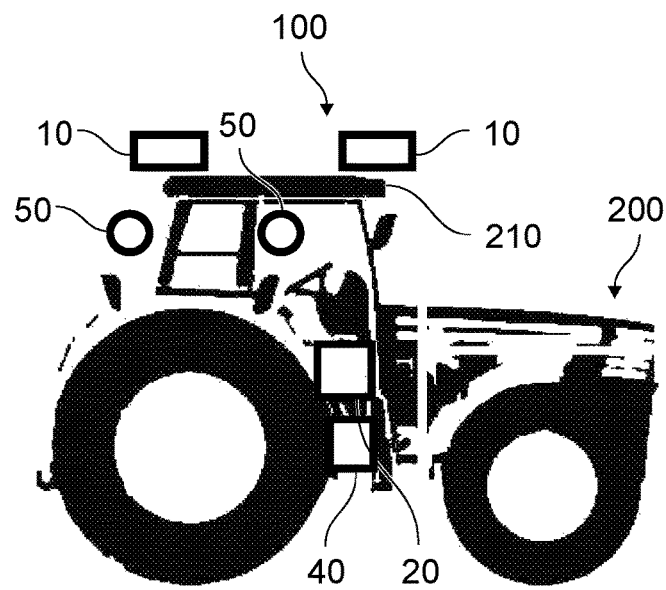

The present invention relates to a method for adjusting the light of illuminants of a working illumination of a machine by means of a control unit and at least one signaling device, the control unit having a signal connection to the illuminants and to the at least one signaling device by means of signal lines.

Various systems for adjusting the light of illuminants of a working illumination of a machine are known in the prior art. For example, sensor-based systems in which illuminants are adjusted by means of control signals from various sensors such as light sensors, motion sensors, and/or object detection sensors are known. A bus system can be used in order to coordinate the light adjustment. For this purpose, besides the existing signal lines of the wiring harness of the machine, further, bus-specific lines must also be laid in the wiring harness of the machine. This is linked to corresponding costs and is not readily possible in the case of every light system. Wireless expansion systems provide a further option for coordinating the light adjustment. However, such expansion systems are susceptible to interference from external signals, generally require a separate power supply, and are likewise linked to additional cost.

The problem addressed by the present invention is that of at least partially dealing with the issues described above. In particular, the problem addressed by the invention is that of creating a method, a working illumination for a machine, and a machine having the working illumination with economical and reliably functioning light adjustment for illuminants.

The aforementioned problem is solved by means of the claims. In particular, the aforementioned problem is solved by means of the method, the working illumination, and the machine according as prescribed herein. Further advantages of the invention are clear from the dependent claims, the description, and the drawings. Of course, features and details described in connection with the method also apply to the working illumination according to the invention and to the machine according to the invention, and vice versa, so that, with respect to the disclosure of the individual aspects of the invention, mutual reference always is or can be made.

According to a first aspect of the present invention, a method for adjusting the light of at least one illuminant of a working illumination of a machine by means of a control unit and at least one signaling device is provided, the control unit having a signal connection to the at least one illuminant and to the at least one signaling device by means of signal lines. The light of the at least one illuminant is performed by modulating a voltage supply of the at least one illuminant and/or of the at least one signaling device via the signal lines.

By means of the modulation of the voltage supply, control signals or data can be transferred and/or exchanged within the working illumination without dependence on further signal lines, such as those of a bus system. Therefore, smart, self-regulating light control is thereby possible without the use of additional hardware. Corresponding hardware costs can be saved. By means of the method according to the invention, it is possible to operate an existing simple working illumination as a smart working illumination in a particularly simple manner, in which working illumination a basic variant and a preferred variant can be operated by means of one wiring harness.

The method functions with one or more illuminants, each illuminant being able to have a plurality of lighting elements. That is, the illuminants can also be modularly designed, for example in the form of an illuminant matrix. The control unit can be understood to be an open-loop and/or closed-loop controller. In the present case, the control unit can also be understood to be a signaling device.

The at least one signaling device can be at least one light sensor, at least one light control device, at least one vehicle control device, an eye-tracking system, or any other component of the working illumination or of the machine that can be actuated or controlled in an open-loop and/or closed-loop manner. By means of the modulation of the voltage supply according to the invention, smart communication can be established between these components within the working illumination. All transmitters and receivers of modulated data can be understood to be said components or subscribers.

In principle, non-subscribers can also be supplied by means of the same wiring harness as subscribers. To the extent possible, subscribers and non-subscribers should not have a large inherent capacitive load. If this is the case, the inherent capacitive load can be decoupled by means of inductance.

The modulation of the voltage supply enables any bus topology. The cable lengths between the subscribers can be, for example, up to 100 m long when the present method is used, if there are no further loads connected to the same branch of the network.

In principle, the frequency of the voltage modulation can be freely selectable within technical limits. The subscribers or the individual components of the working illumination are preferably in a master-slave mode, in which one subscriber is the master and assumes responsibility for the communication with superordinate networks, such as a CAN connection to a vehicle bus.

The voltage supply can be modulated in accordance with power-line communication (PLC). The control unit can have a vehicle control unit (VCU) and/or a light control unit (LCU) in order to modulate the voltage supply. Particularly good performance of the method can be achieved if an independent light control unit is used.

It can be advantageous if a master-slave network according to the invention has physical collision control or a corresponding control method. In the case of such a system or method, all subscribers of the network or in a network of the working illumination must log on when the working illumination is initialized. This log-on can be carried out within the framework of a multi-step lottery method. In this way, it can be ensured that no virtual IP address is assigned multiple times.

A different number of subscribers can be supplied by means of the modulated voltage, depending on the desired response time, the cycle frequency and/or the data volume with respect to the working illumination. In a network having the various subscribers, different frequencies can be produced by means of one or more channels per line. It is advantageous if each channel has a separate hardware interface.

In a further development of the present invention, it is possible that, in a method, the voltage supply is performed in a range of ±0.6 V to 1 V. At this voltage, the best results could be achieved in tests in the context of the present invention.

Furthermore, it is possible that the modulation is performed in a bit-wise manner in a method according to the invention. As a result of the bit-wise transfer at a hardware interface, bus protocols can be freely selected.

According to a further aspect of the present invention, a working illumination for a machine, comprising at least one illuminant, at least one signaling device for the at least one illuminant, and a control unit, which has a signal connection to the at least one illuminant and to the at least one signaling device by means of signal lines, is provided. The control unit is configured and designed to adjust the light of the at least one illuminant by the modulation of a voltage supply of the at least one illuminant and/or of the at least one signaling device via the signal lines by means of the control unit. Thus, a working illumination according to the invention provides the same advantages that were described in detail in relation to the method according to the invention. The working illumination can be designed in the form of a PLC light network.

In addition, it is possible that, in a working illumination according to the present invention, the control unit has a UART-to-PLC circuit as an interface for the at least one illuminant and for the at least one signaling device. Such a UART-to-PLC circuit has proven particularly reliable and efficient in extensive tests in the context of the present invention.

A UART (universal asynchronous receiver/transmitter) circuit can be understood to be an electronic circuit used to realize digital serial interfaces. A UART circuit can be an independent electronic part, such as UART chip or UART module, or a function block of a more highly integrated component, such as a microcontroller.

According to a further design variant of the present invention, it is possible that, in a working illumination, the control unit has an upstream light control unit as a master. By means of a corresponding master-slave arrangement, signals can be sent and received particularly reliably in the working illumination.

Furthermore, it has been found to be advantageous if, in a method according to the invention, the control unit is arranged in a subnetwork of the working illumination. This leads to an efficient mode of operation of the working illumination. In this case, the control unit, more particularly in the form of a separate light control unit, is the starting point of the subnetwork. In a working illumination according to the invention, the subnetwork comprises preferably all light functions not permitted for road travel, which exchange data with each other. The subnetwork for light control by the modulation of the voltage supply enables independent smart light control, which realizes a self-regulating working illumination in a simple and reliable manner.

According to a further aspect of the present invention, a machine having a working illumination as described in detail above is provided. The machine has a cabin for the user of the working illumination. Thus, a machine according to the invention also provides the advantages presented above. The machine is preferably designed as a mobile machine, more particularly as an agricultural machine such as a tractor, a combine, a harvester, or the like. The cabin should be understood to be a driver cabin or user cabin, in which the user or driver of the machine is present while said user or driver operates the machine. The cabin can be an open cabin or a closed or closable cabin. Basically, the cabin should be understood to be a delimited or predefined location or a corresponding space at or in which a person stays during the use of the machine.

In the case of a machine according to the invention and a working illumination proposed for said machine, the at least one illuminant can be designed to produce working light with at least 2,000 lumens. That is, the illuminant is able to produce working light with a luminous flux of at least 2,000 lumens. Furthermore, it is possible that, in a machine according to the invention or a working illumination according to the invention, a plurality of illuminants for each producing working light with at least 2,000 lumens is arranged. The working light of the machine can thereby be increased to, for example, 4,000 lumens, 6,000 lumens, or even over 10,000 lumens. In the case of machines of the type in question, particularly in difficult weather conditions and/or ambient conditions, such a luminous flux can determine whether the work can be satisfactorily completed or not.

Figure 2:
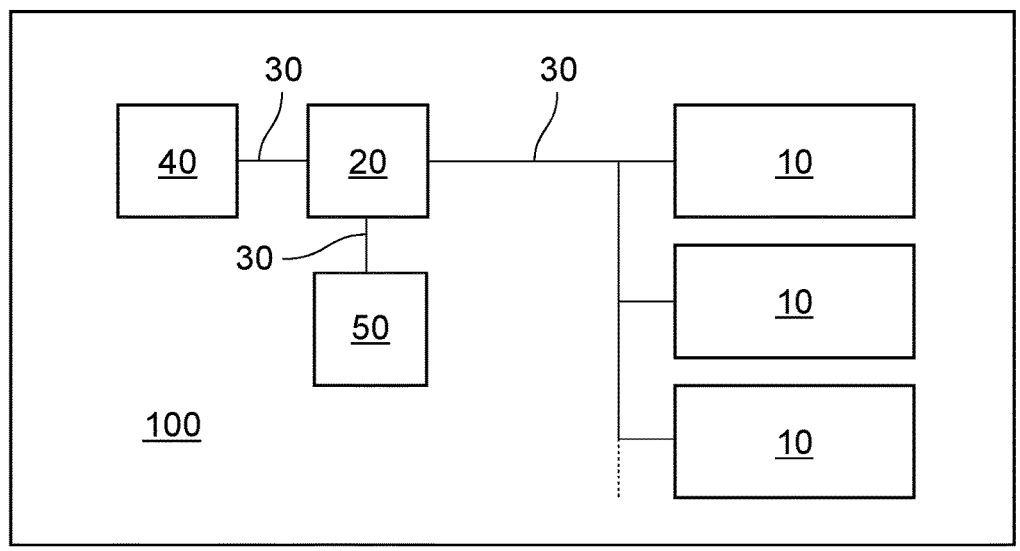
Figure 3:
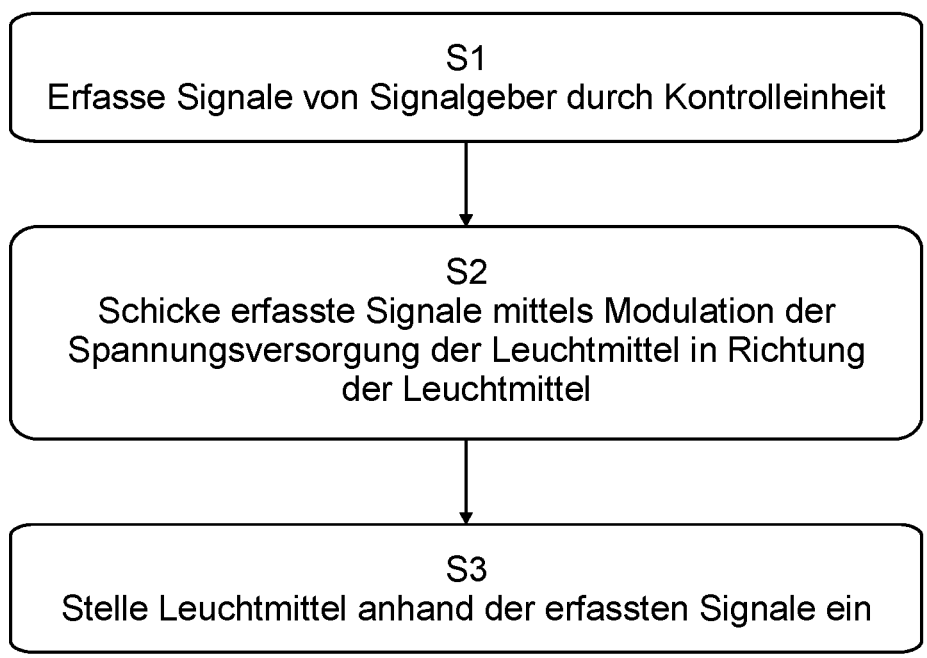

Further measures that improve the invention are clear from the description of various embodiments of the invention below, which embodiments are presented schematically in the figures. All features and/or advantages clear from the claims, the description, or the drawing, including design details and spatial arrangements, can be essential to the invention both in themselves and in the various combinations. dr The invention is explained in more detail below on the basis of the enclosed drawings. The figures show:

FIG. 1 a machine having a working illumination according to an embodiment according to the invention, FIG. 2 a working illumination according to the invention, FIG. 3 a flowchart for illustrating a method according to the invention.

Elements having the same function and mode of action are given the same reference signs in FIGS. 1 to 3.

FIG. 1 shows a machine 200 in the form of a tractor having a working illumination 100. The machine 200 has a cabin 210 for a driver of the tractor.

The working illumination 100 shown in FIG. 1 has two illuminants 10 in the form of LED illuminants and two signaling devices 50 in the form of light sensors or reference light sensors. The signaling devices 50 are designed to produce a control signal for the two illuminants 10. The working illumination 100 also has a control unit 20 in the form of a light control device, which has a signal connection to the two illuminants 10 and to the two signaling devices 50 by means of signal lines 30. The control unit 20 is configured and designed to adjust the light of the illuminants 10 by modulating a voltage supply of the illuminants 10 and of the signaling devices 50 via the signal lines 30.

The control unit 20 has a UART-to-PLC circuit as an interface for the two illuminants 10 and for the two signaling devices 50. The control unit 20 also has an upstream light control unit as a master. In addition, the control unit 20 is arranged in a subnetwork of the working illumination 100. The presented machine 200 or the working illumination 100 also has a control device 40 in the form of a vehicle control device.

In FIG. 2, a working illumination 100 is presented separately from the machine 200. In FIG. 2, the signal lines 30 in particular are clear, which are designed in the form of current or voltage lines.

With reference to FIG. 3, a method for adjusting the light of the illuminants 10 described above in the working illumination 100 of the machine 200 is then explained. For the desired actuation of the various illuminants, the control unit 20 can transmit to the illuminants 10 by modulating the voltage supply on the basis of signal information from the sensor 50 and on the basis of a corresponding command from the control device 40. For this purpose, conversion modules (not shown) are arranged between the control unit 20 and the illuminants 10 in order to convert the control signals sent by the control unit 20 into corresponding modulated voltage signals or PLC signals and to subsequently convert the PLC signals back into suitable control signals for the illuminants 10.

In a first step S1, signals of at least one signaling device 50 of the working illumination 100 are captured. The signaling device 50 can be the light sensor. However, the signaling device could also be the control unit 20 itself, the control device 40, or another component of the working illumination that is designed to transmit electrical and/or digital signals.

In a second step S2, the captured signals are sent toward the illuminants 10 via the signal lines 30 by means of a modulation of a voltage supply of the illuminants 10 and/or of the at least one signaling device 50. The voltage supply is performed in a bit-wise manner in a range of ±0.6 V to 1 V.

In a subsequent third step S3, the illuminants 10 are adjusted on the basis of the captured signals. For this purpose, a decoder can be used to transmit and receive the captured signals. Important here is the smart signal communication or data communication between the various components of the working illumination 100 by means of the modulation of the voltage supply, more particularly in the form of a PLC light network, for the correspondingly intelligent adjustment of the illuminants 10. In this case, signals can also first be sent between various signaling devices and/or signal receivers by means of the modulation of the voltage supply, i.e. before said signals finally reach the illuminants 10 or at least one of the illuminants 10.

In addition to the presented embodiments, the invention also permits further design bases. That is, the invention should not be considered limited to the embodiments presented in the figures.

LIST OF REFERENCE SIGNS

10 Illuminant
20 Control unit
30 Signal line
40 Control device
50 Signaling device
100 Working illumination
200 Machine
210 Cabin

The invention claimed is:

1. A working illumination for a machine, comprising at least one illuminant, at least one signaling device for the at least one illuminant, and a control unit, which has a signal connection to the at least one illuminant and to the at least one signaling device by means of signal lines,
wherein
the control unit is configured and designed to adjust the light of the at least one illuminant by modulating a voltage supply of the at least one illuminant or of the at least one signaling device via the signal lines and
the control unit has a UART-to-PLC circuit as an interface for the at least one illuminant and for the at least one signaling device.

2. The working illumination according to claim 1, wherein the control unit has an upstream light control unit as a master.

3. The working illumination according to claim 1, wherein the control unit is arranged in a subnetwork of the working illumination.

4. A machine having a working illumination for a machine, comprising at least one illuminant, at least one signaling device for the at least one illuminant, and a control unit, which has a signal connection to the at least one illuminant and to the at least one signaling device by means of signal lines, wherein the control unit is configured and designed to adjust the light of the at least one illuminant by modulating a voltage supply of the at least one illuminant or of the at least one signaling device via the signal lines and the control unit has a UART-to-PLC circuit as an interface for the at least one illuminant and for the at least one signaling device, said machine comprising a cabin for the user of the working illumination.

5. The machine according to claim 4, wherein the control unit has an upstream light control unit as a master.

6. The machine according to claim 4, wherein the control unit is arranged in a subnetwork of the working illumination.

* * * * *